(12) United States Patent
Xiao et al.

(10) Patent No.: US 11,057,982 B2
(45) Date of Patent: Jul. 6, 2021

(54) ROTARY MODULE FOR AN ACCELERATOR SYSTEM

(71) Applicant: GSI Helmholtzzentrum fuer Schwerionenforschung GmbH, Darmstadt (DE)

(72) Inventors: Chen Xiao, Darmstadt (DE); Michael Maier, Lorsch (DE)

(73) Assignee: GSI HELMHOLTZZENTRUM FUER SCHWERIONENFORSCHUNG GMBH, Darmstadt (DE)

(*) Notice: Subject to any disclaimer, the term of this patent is extended or adjusted under 35 U.S.C. 154(b) by 482 days.

(21) Appl. No.: 15/769,380

(22) PCT Filed: Sep. 22, 2016

(86) PCT No.: PCT/EP2016/072565
§ 371 (c)(1),
(2) Date: Apr. 19, 2018

(87) PCT Pub. No.: WO2017/067735
PCT Pub. Date: Apr. 27, 2017

(65) Prior Publication Data
US 2018/0317310 A1    Nov. 1, 2018

(30) Foreign Application Priority Data

Oct. 22, 2015   (DE) .......................... 102015118017.0

(51) Int. Cl.
*H05H 7/00*   (2006.01)
*H02P 8/30*   (2006.01)
*H05H 7/04*   (2006.01)

(52) U.S. Cl.
CPC ............... *H05H 7/001* (2013.01); *H02P 8/30* (2013.01); *H05H 7/00* (2013.01); *H05H 7/04* (2013.01);
(Continued)

(58) Field of Classification Search
CPC ............ H05H 7/00; H05H 7/001; H05H 7/04; H05H 9/00; H05H 9/041; H05H 9/044; H02P 8/30
(Continued)

(56) References Cited

U.S. PATENT DOCUMENTS

| 4,040,189 A | 8/1977 | Lacoste |
| 4,587,383 A | 5/1986 | Stoldt |

(Continued)

FOREIGN PATENT DOCUMENTS

| JP | H 07302563 A | 11/1995 |
| JP | 2002267759 A | 9/2002 |

OTHER PUBLICATIONS

"Katalog 2014, allectra high vacuum and UHV components", Jan. 1, 2014 (Jan. 1, 2014), XP055323139, pp. 9.4, 9.5.
(Continued)

*Primary Examiner* — Jason L McCormack
(74) *Attorney, Agent, or Firm* — Leydig, Voit & Mayer, Ltd.

(57) ABSTRACT

A rotary module for a measuring device of an accelerator facility includes a first radial bearing including a first bearing side configured to be paired with an accelerator-side flange connection and further including a second bearing side configured to receive the measuring device on the first radial bearing in a bearing manner such that the measuring device is connected to the accelerator facility by the first radial bearing; and a drive configured to control a rotational movement of the measuring device about an axis of rotation.

15 Claims, 9 Drawing Sheets

(52) U.S. Cl.
CPC ............... *H01J 2237/166* (2013.01); *H01J 2237/24514* (2013.01); *H05H 2007/008* (2013.01)

(58) Field of Classification Search
USPC ..................................................... 250/492.3
See application file for complete search history.

(56) References Cited

U.S. PATENT DOCUMENTS

| | | | | |
|---|---|---|---|---|
| 2004/0113099 | A1* | 6/2004 | Eickhoff | G21K 5/04 250/492.3 |
| 2009/0283703 | A1* | 11/2009 | Tamura | G21K 1/046 250/492.3 |
| 2010/0181470 | A1* | 7/2010 | Farley | H01J 37/244 250/252.1 |
| 2011/0285327 | A1* | 11/2011 | Begg | A61N 5/1081 315/502 |
| 2014/0357930 | A1 | 12/2014 | Amélia | |

OTHER PUBLICATIONS

"Vakuumtechnik—Komponenten-Katalog", Jan. 1, 2007 (Jan. 1, 2007), XP055323134, pp. 68-69.
John F. O'hanlon: ,,Chapter 17: Joints, Seals, and Valves "In: ,,A User's Guide to Vacuum Technology", Jan. 1, 2003 (Jan. 1, 2003), XP055323166, pp. 313-344.
Anonymous: SPIE, PO Box 10 Bellingham WA 98227-0010 USA, 2010, XP040524775, p. 2-p. 4; figures 2-4, p. 8-p. 9; figure 10.
Peter Forck: "Lecture notes on beam instrumentation and diagnostics: Joint University Accelerator School, Jan.-Mar. 2011", Mar. 1, 2011 (Mar. 1, 2011), XP055349716, pp. 68-70.
Mark Woodley et al: "Measurements and Correction of Cross-Plane Coupling in Transport Lines", Measurements and Correction of Cross-Plane Coupling in Transport Lines, Jan. 1, 2000 (Jan. 1, 2000), XP055349733.
Written Opinion of International Searching Authority, European Patent Office, dated Mar. 8, 2017, pp. 1-12.

\* cited by examiner

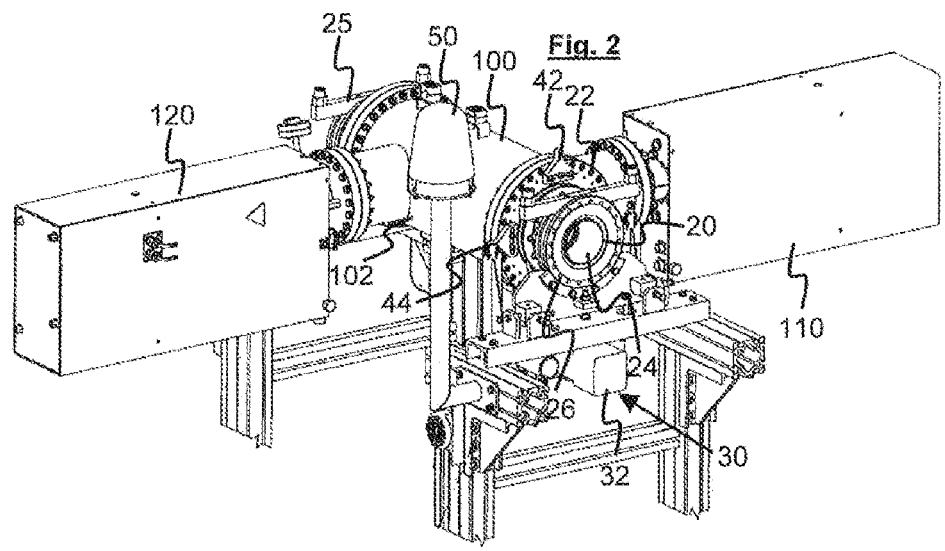
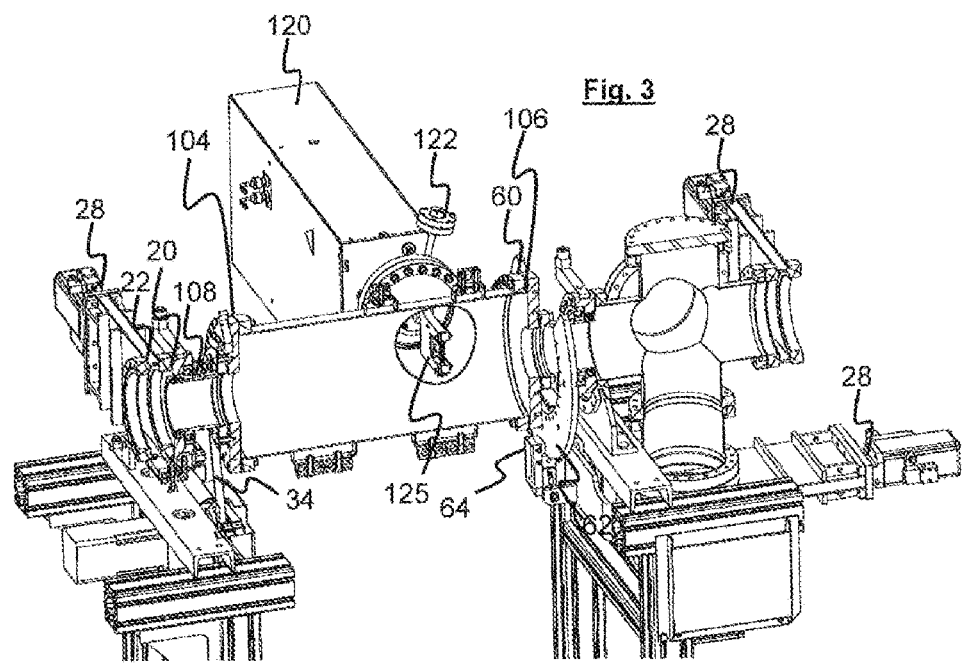

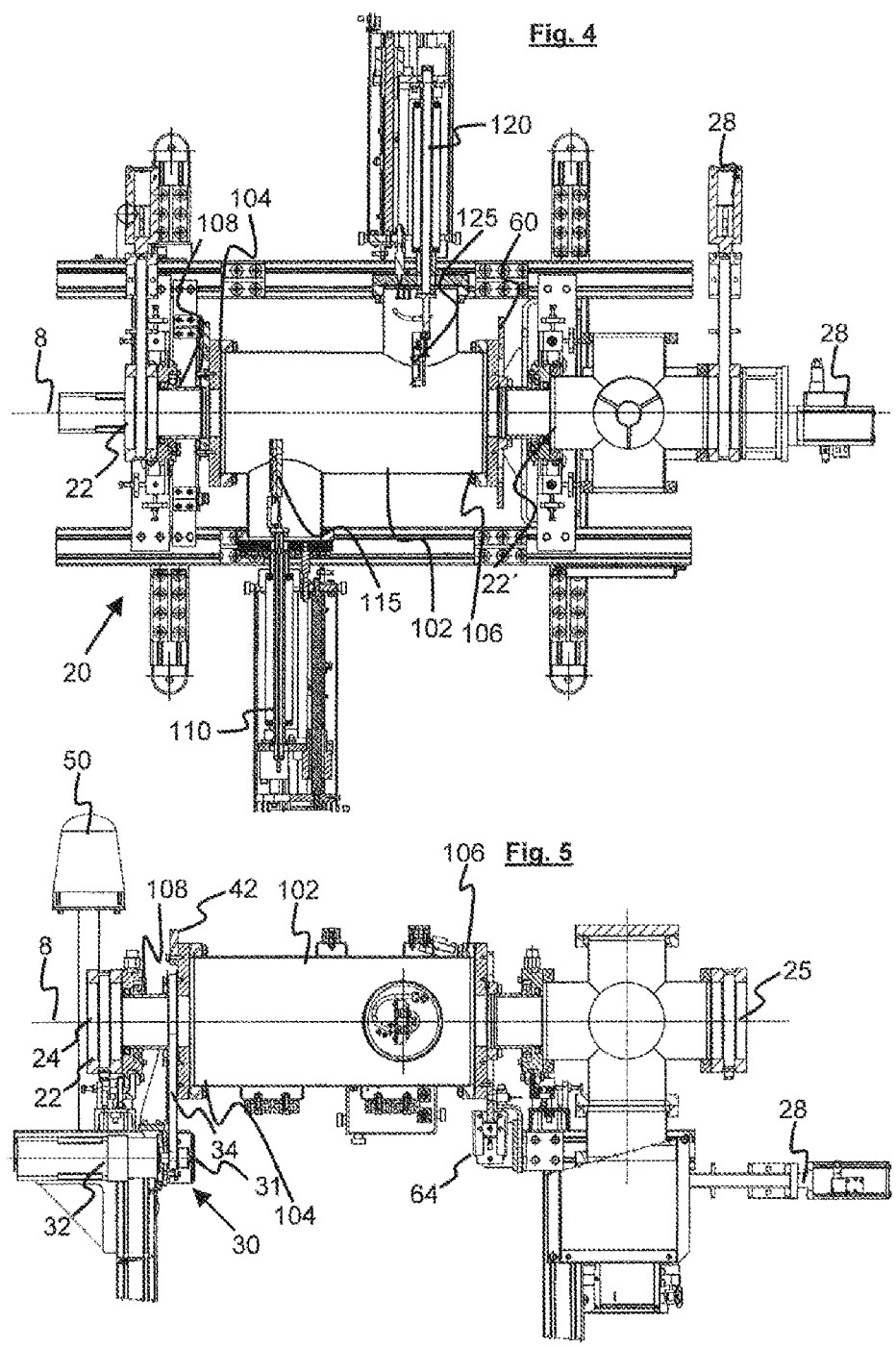

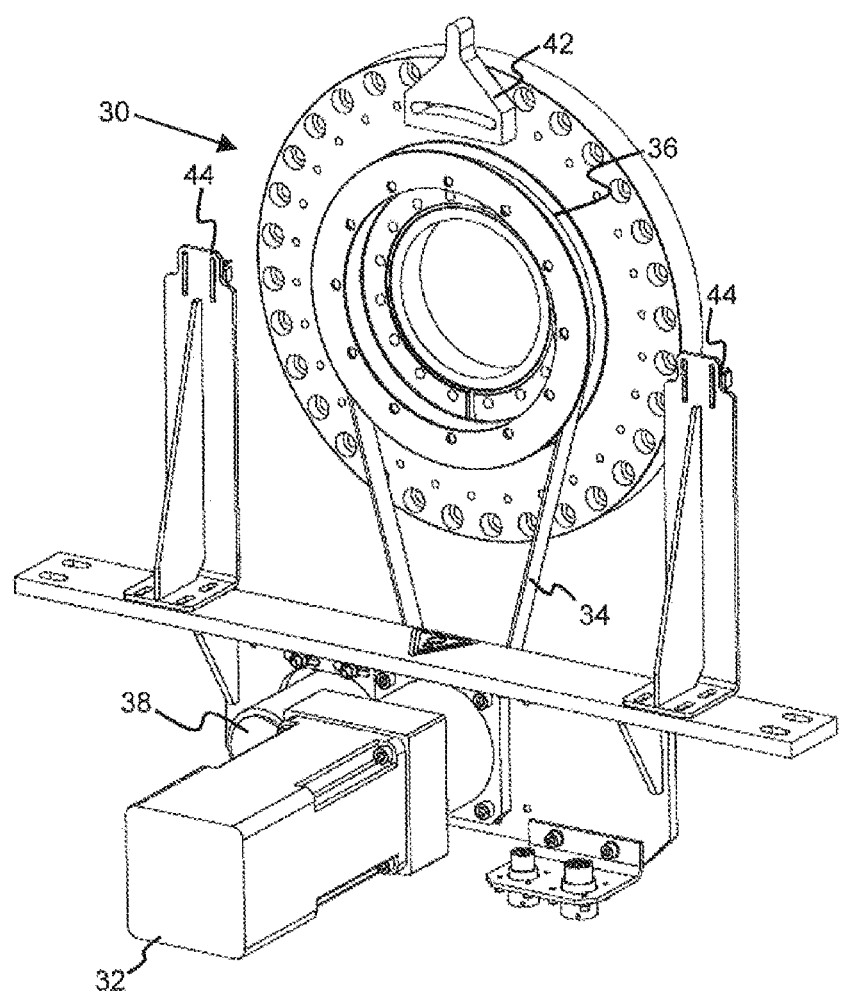

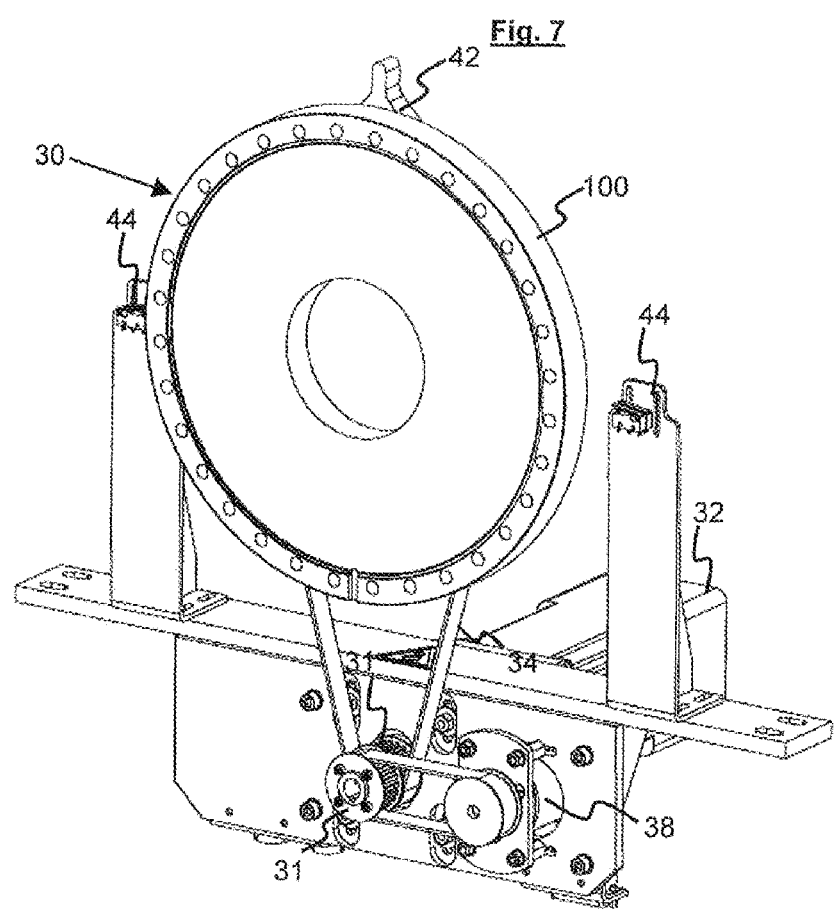

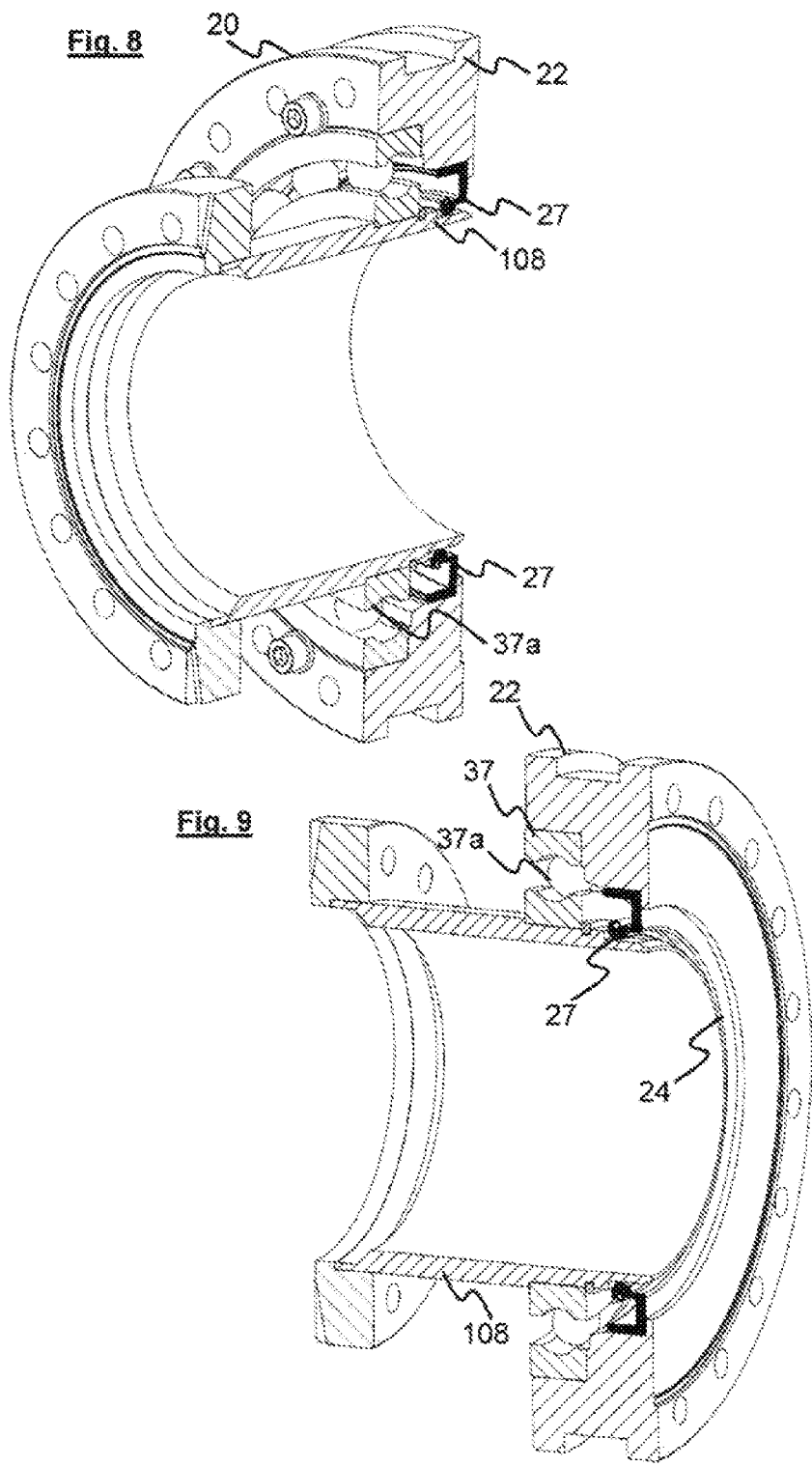

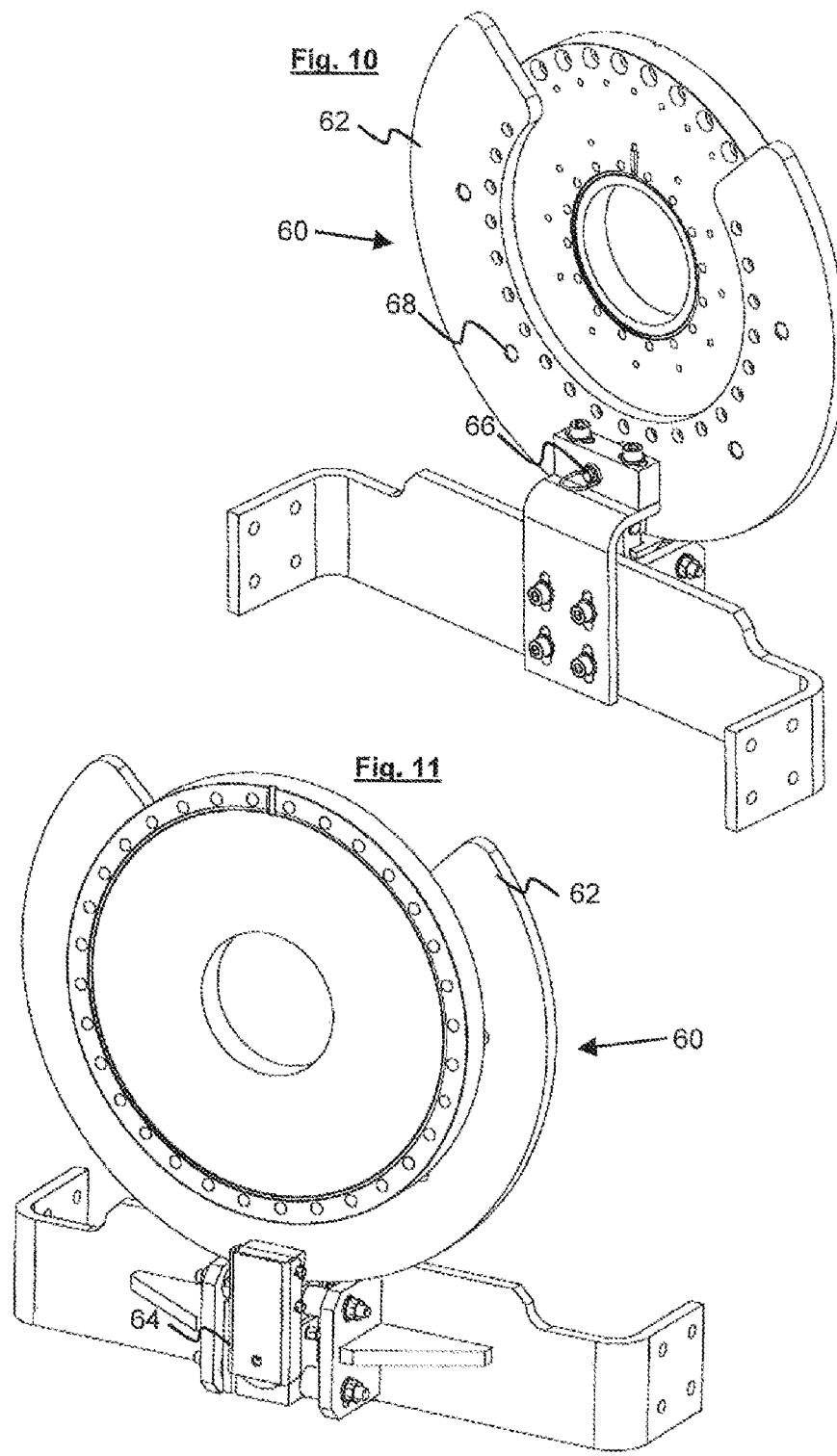

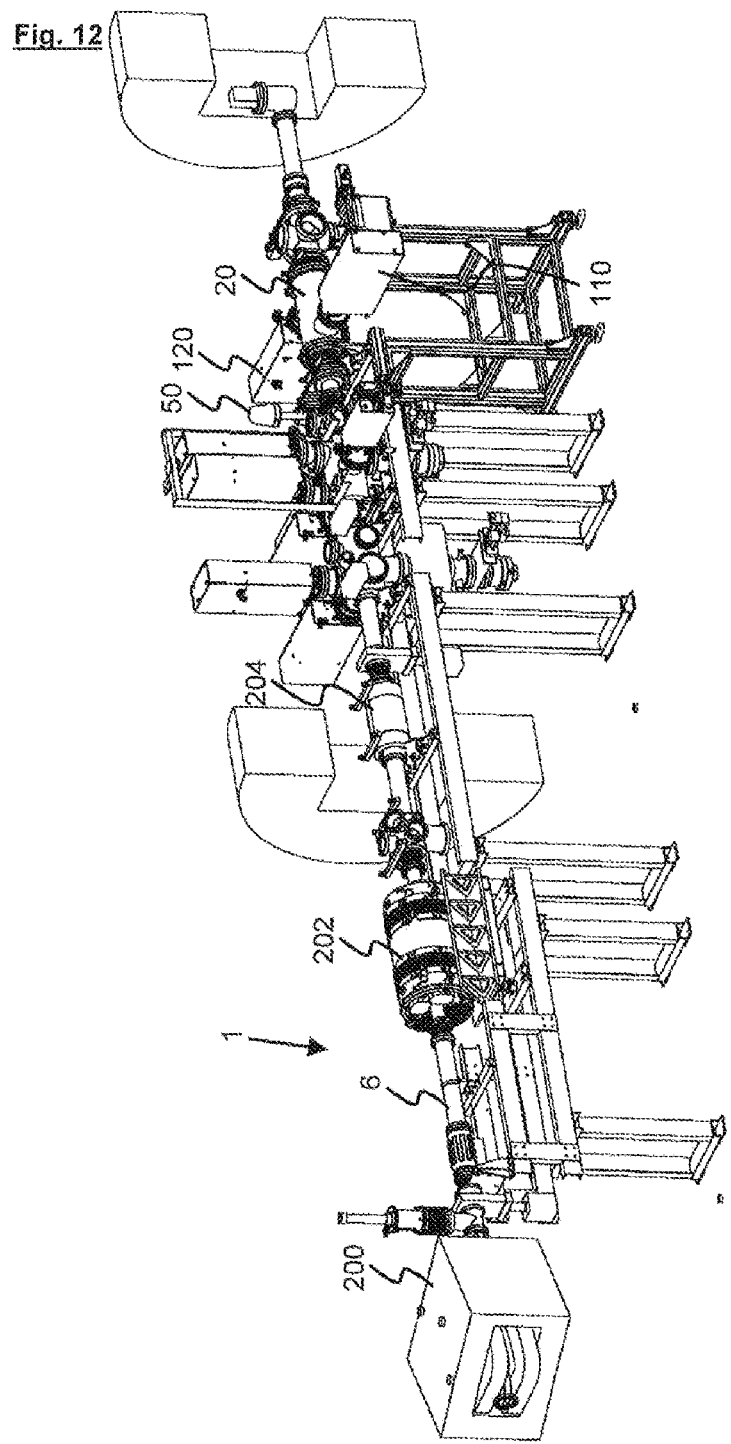

ROTARY MODULE FOR AN ACCELERATOR SYSTEM

CROSS REFERENCE TO RELATED APPLICATIONS

This application is a U.S. National Stage Application under 35 U.S.C. § 371 of International Application No. PCT/EP2016/072565 filed on Sep. 22, 2016, and claims benefit to German Patent Application No. DE 10 2015 118 017.0 filed on Oct. 22, 2015. The International Application was published in German on Apr. 27, 2017 as WO 2017/067735 A1 under PCT Article 21(2).

FIELD

The invention relates to a rotary module for an accelerator facility, to a rotatable slit grid emittance measuring facility, and to a method for determining the emittance of a particle beam.

BACKGROUND

In an accelerator facility, a particle beam is typically formed from a beam source, accelerated to extraction energy and guided to a target.

The emittance is a key quality factor for such particle beams in particular. The emittance is defined as the phase space occupied as a result of the distribution of particles in the beamline, and is suitable for quantifying the beam quality and adapting the beam to the subsequent beam optics in each case.

For hadrons above a certain kinetic energy, measuring the phase space may be difficult or may not have been possible until now. A measurement of this emittance variable that is pertinent in particular to designing particle accelerators may only be possible if projections of this phase space can be measured using two separate measurements, for example in the horizontal x-x' plane and the vertical y-y' plane. In this respect, no correlations form between the planes or said correlations are so small that a dependency between the planes can be disregarded; a sufficient result can be achieved using such a measurement. However, recent requirements that call for higher particle beam quality and recent knowledge, for example of the dependence on influences of non-linear fields, for example dipole fringe fields, magnetic coils or magnets inserted at an angle, or even as a result of beam losses in a beamline, show that there is not always an independence of this type between the measuring planes.

SUMMARY

In an embodiment, the present invention provides a rotary module for a measuring device of an accelerator facility. The rotary module includes a first radial bearing including a first bearing side configured to be paired with an accelerator-side flange connection and further including a second bearing side configured to receive the measuring device on the first radial bearing in a bearing manner such that the measuring device is connected to the accelerator facility by the first radial bearing; and a drive configured to control a rotational movement of the measuring device about an axis of rotation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 shows another rotary module;

FIG. 3 is a sectional view of another rotary module;

FIG. 4 is a sectional plan view of a rotary module comprising a measuring device;

FIG. 5 is a side view of a rotary module;

FIG. 6 is a detailed view of a drive device of a rotary module;

FIG. 7 is another detailed view of a drive device of a rotary module;

FIG. 8 is a detailed view of a radial bearing;

FIG. 9 is another detailed view of a radial bearing;

FIG. 10 is a detailed view of a braking device;

FIG. 11 is another detailed view of a braking device;

FIG. 12 shows an example construction of part of an accelerator facility comprising a rotary module;

DETAILED DESCRIPTION

Figure 1:
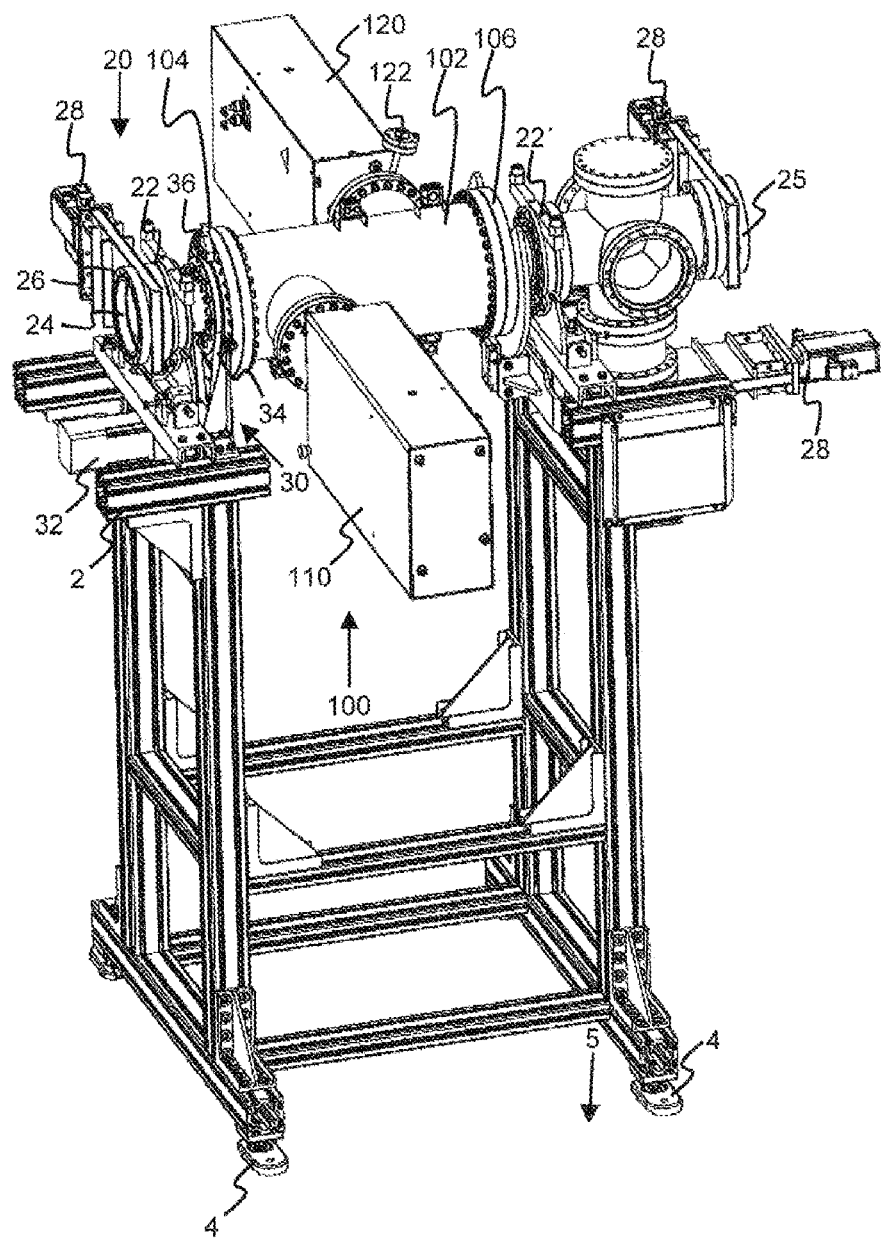
FIG. 1 is a general view of a rotary module comprising a measuring device.

One or more embodiments of the invention provide a rotary module which makes it possible to attach or insert a measuring station or measuring device to or in an accelerator in a rotary manner. The rotary module provides a variable installation length in which the measuring device can be inserted, so that various measuring devices can be inserted.

One or more embodiments of the invention provide a measuring device that is capable of making the entire phase space of a particle beam measurable, it also being possible to measure dependencies between the planes.

A rotary module according to one or more embodiments of the invention for a measuring device of an accelerator facility comprises a first radial bearing comprising a first bearing side, which side is designed such that it can be paired with an accelerator-side flange connection. The first radial bearing can, for example, be designed such that it can be mounted on a standardized support receptacle of a component support for accelerator facilities. Such component supports are universally used on a particular accelerator facility. The first radial bearing is preferably designed as a radial rolling bearing, rolling bodies being arranged between a bearing guide of the radial bearing and a bearing part of the measuring device.

In order to increase the tightness of the radial bearing, in particular when said bearing is formed as a radial rolling bearing that is to be designed to be as vacuum-tight as possible, a radial sealant that seals the circumference of the radial bearing can be used, for example a sealing lip made of a suitable material. In addition or as an alternative, it has proven useful to integrate a gate valve into the radial bearing, which separates the remaining part of the accelerator that is under vacuum from the radial bearing during the rotational movement and therefore prevents increases in pressure that affect the rest of the accelerator. When the end position is reached, for example a measuring position, the gate valve is opened. The rolling bearing or the radial sealant is designed such that it achieves an improved sealing effect when the measuring device is not operating, and any increases in pressure can therefore be kept to a minimum.

The first radial bearing also comprises a second bearing side for receiving the measuring device on the first radial bearing in a bearing manner. For example, the measuring device can engage in the radial bearing by means of the bearing part, the bearing part of the measuring device forming the mating bearing, fulfilling the function of the radial bearing together with said radial bearing and ensuring that the measuring device is rotatable. The bearing part is preferably or alternatively designed to be detachable from the measuring device so that the bearing part can remain in the radial bearing and the measuring device can be fastened to a bearing part flange of the bearing part, for example. This makes it easier to assemble, remove or exchange the measuring device.

The measuring device is therefore connected to the accelerator facility by means of the first radial bearing. The accelerator facility typically comprises a beamline in which a particle beam is guided. The bearing flange of the first radial bearing is connected to the beamline in this case. The particle beam is in particular guided in the beamline so that the particle beam is guided through the accelerator facility, the first radial bearing and through the measuring device, along a beam axis. In other words, the particle beam passes through the measuring device.

In the preferred case whereby the measuring device is a beam measuring device that measures properties of the particle beam of the accelerator facility in particular, the beam measuring device can measure the beam properties directly at the particle beam passing through the measuring device.

The rotary module also comprises a drive for controlling a rotational movement of the measuring device about an axis of rotation. For example, the drive can on the bearing part either directly or by means of a drive connection and cause a rotational movement.

The rotary module can also comprise a second vacuum-tight radial bearing comprising a first bearing side for receiving the measuring device on the radial bearing in a bearing manner. The second radial bearing is arranged on the measuring device so as to be opposite the first radial bearing. In other words, the measuring device is arranged between the first and the second radial bearing.

The rotary module can also comprise an angle-of-rotation measuring instrument for establishing an angle of rotation of the measuring device, it being possible for the angle-of-rotation measuring instrument to be connected to the drive, in particular either directly or by means of a drive connection. The angle-of-rotation measuring instrument is in particular designed to measure the angle of rotation of the measuring device with regard to a neutral position. The neutral position can, for example, be a plane that extends in parallel with the surface of the ground. The neutral position can, for example, also be the plane of the horizontal or the vertical particle vibration.

The rotary module can also comprise an end stop comprising at least one limit switch for delimiting the angle of rotation available for the measuring device. The end stop can be purely electrical or electronic, and therefore the rotational movement is stopped when a specific angle of rotation is reached. The end stop can also comprise a mechanical stop, which defines a maximum angle of rotation for the measuring device. Two end stops are preferably used so that, starting from the neutral position, the measuring device can rotate in two directions, e.g. a positive and a negative direction, or can rotate to the right or to the left in the beam direction.

The drive can comprise a stepper motor, which makes it possible to set the measuring device with great accuracy and to digitally activate it, for example. Furthermore, commercially available, proven motor technology can therefore be accessed in this case, ensuring reliable and sustained operation.

The drive can transmit the rotational movement to the measuring device by means of a belt drive, for example. For this purpose, the drive may comprise a sheave and the measuring device may comprise a suitable driving element, for example in the form of a pulley, so that force is transmitted between the drive and the measuring device by means of the tensioned belt. The belt drive is particularly cost-effective. A gear connection can also be formed, which can be designed so as to be particularly durable and which can further reduce the chances of a potential angle of rotation error caused by transmission so that the use of an angle-of-rotation measuring instrument may be omitted if appropriate.

The rotary module preferably comprises a braking device for slowing down or stopping the rotational movement of the measuring device. In a simple embodiment, the braking device can be formed as a disk brake, as is known in the automotive industry, for example. For this purpose, a corresponding circumferential or partially circumferential disk can be arranged on the measuring device. Braking means, for example simple brake pads, can then be arranged on the rotary module. The braking device can also be used to lock the measuring device in a measuring position so that a sufficiently vibration-free arrangement of the measuring device and therefore a decrease in the number of measurement errors can be achieved.

The beam axis in particular substantially extends through the center of the rotary module and the measuring device, along which axis the particle beam extends. The axis of rotation of the rotary module is in particular identical to the beam axis.

The particle beam of the accelerator facility can be, in particular, a particle beam of this type that comprises hadrons, for example, and is a hadron beam, or comprises ions (charged hadrons) and is an ion particle beam. In general, a measurement on a photon beam, on an electron beam (lepton beam) or on a hadron beam can be of interest, with the use in the field of hadron beams being particularly preferred.

The accelerator facility preferably comprises a linear particle accelerator and/or a beam transport path. Furthermore, the accelerator facility can also comprise a synchrotron or cyclotron for accelerating or further accelerating the particles of the particle beam. The accelerator facility more preferably comprises an ion linear accelerator and/or an ion synchrotron. Such an accelerator facility can be designed to comprise a rotary module such as that described above.

According to one or more embodiments of the invention, a rotatable slit grid emittance measuring facility is also proposed, which comprises a rotary module such as that described above and the beam measuring device described above for measuring the overall four-dimensional emittance, i.e. in particular also the coupling emittances or the coupling proportions established in correlations between the planes of vibration of the particle beam.

Measuring the one-dimensional beam emittance using a slit grid arrangement in each case is known in principle. The coupling emittances are of particular interest in accelerator facilities that provide a beam energy of more than 100 keV/u (kiloeletronvolts per nucleon), preferably 150 keV/u and more preferably 200 keV/u. However, the energy range below a beam energy of approximately 100 keV/u (150 keV/u; 200 keV/u) is also available using other measuring methods, such as the "pepper-pot" measurement, in order to be able to draw conclusions about the four-dimensional distribution of the beam emittance.

The emittance measuring device according to one or more embodiments of the invention can in fact be substantially universally used, since a charge per time per grid wire is typically measured independently of energy and mass number. In contrast, pepper-pot works using optical diagnosis, for example, and can therefore be dependent on the intensity, the mass number and the beam energy, for example.

In other words, the emittance measuring device according to one or more embodiments of the invention can perform a measurement in practically any energy range and in particular irrespective of the particle mass or the beam intensity. Measurement ranges that are of interest for the applicant and in which a measurement can advantageously be performed using the emittance measuring device according to one or more embodiments of the invention, are, for example, the energy levels of the UNILAC accelerator structure, i.e. in particular above an energy of 300 keV/u or above the energies provided by the Alvarez-type cavities (3.2 MeV/u, 4.9 MeV/u, 8.6 MeV/u and 11.4 MeV/u). In particular, the measuring system according to one or more embodiments of the invention also makes it possible to perform a measurement in the energy range provided according to the SIS-18 heavy-ion synchrotron, for example, but also in the energy range that is intended to be provided by the future SIS-100 synchrotron, for example.

In order to determine the four-dimensional RMS emittance (RMS=Root Mean Square) of a particle beam, the four-dimensional beam matrix C needs to be known:

$$C = \begin{bmatrix} (xx) & (xx') & (xy) & (xy') \\ (x'x) & (x'x') & (x'y) & (x'y') \\ (y'x) & (y'x') & (y'y) & (y'y') \end{bmatrix}$$

in which x represents the horizontal coordinates, y represents the vertical coordinates, x' represents the movement of particles (phase) in the x direction, and y' represents the movement of particles (phase) in the y direction.

In a particularly advantageous embodiment, the moments of the beam matrix C correspond to the variables that can be measured using the rotatable slit grid emittance measuring facility according to one or more embodiments of the invention.

A matrix element that lies outside of the main diagonal elements in the beam matrix C and has a value that is not zero indicates the presence of a coupling term.

For uncoupled ion beams, the RMS emittances can be calculated as follows using the main diagonal elements of the matrix C:

$$\varepsilon_\mu = \sqrt{(\mu\mu)(\mu'\mu') - (\mu\mu')^2}$$

in which $\mu$ substitutes either x or y.

The four-dimensional RMS beam emittance can also be calculated as follows:

$$\varepsilon_{ad} = \varepsilon_1 \varepsilon_1 \sqrt{\det(C)}$$

in which $\varepsilon_x$ and $\varepsilon_x$ are inherent emittances of the beam, which meet specific conditions known to a person skilled in the art.

In order to simplify any additional calculations, the coupling parameter t that quantifies the coupling between the planes is introduced:

$$t = \frac{\varepsilon_x \varepsilon_y}{\varepsilon_1 \varepsilon_2} - 1 \geq 0$$

When t=0, there is no coupling between the planes; in this case, the projected RMS emittances are identical to the inherent emittances.

It is also advantageous for the accelerator facility manufacturer or operator to know what the emittance is at a specific point of the accelerator. However, the emittance can only be measured at the point at which the measuring device is actually installed. For example, an additional accelerator device, such as a quadrupole magnet having known beam transport inside the quadrupole magnet, can, however, be provided between point i, at which the beam emittance is to be established, and point f, at which said emittance can be measured by the measuring device. The beam matrix $C_f$ at point f is linked to the beam matrix $c_i$ at point i by $$C_f = MC_i M^T, \text{ mit } M = \begin{bmatrix} M_{xx} & M_{xy} \\ M_{yx} & M_{yy} \end{bmatrix}.$$

Provided that one of the submatrices $M_{xy}$ or $M_{yx}$ assumes a number that is not zero, a coupling that is introduced between points i and f is present between the emittance planes.

Furthermore, the use of the rotary module comprising a beam measuring device therefore also provides a method for determining the coupling emittance or the 4D emittance of an accelerator facility, in particular at a specific point f of the accelerator facility or along a stretch of the accelerator between points i and f and/or for energies above 100 keV/u.

For example, the method for determining the 4D coupling emittance of an accelerator facility can be carried out as follows: firstly, the emittance of a particle beam is measured using the beam measuring device when the beam measuring device is in a first measuring position with regard to a first beam plane.

The beam measuring device is then rotated into a second measuring position. The second measuring position is in particular perpendicular to the first measuring position, therefore being at an angle of 90° to the first measuring position. In the second measuring position, the emittance of the particle beam is measured once again using the beam measuring device with regard to a second beam plane.

The beam measuring device is then rotated into a third measuring position, the third measuring position being at an angle other than 90° to the first measuring position or the third measuring position being in particular at an angle of 45° to the first or second measuring position. In the third measuring position, the emittance is measured for the third time with regard to a third beam plane.

In a fourth measuring position, which is in particular at the same angle as the third measuring position, various accelerator magnet settings can be adjusted and the emittance of the particle beam can be measured for the fourth and final time using the beam measuring device with regard to the third beam plane and/or with regard to the modified accelerator magnet settings. For example, the magnetic field of a magnet doublet or singlet that is in front of the measuring apparatus in the beam direction can be changed before the fourth measuring position is reached in order to achieve the modified accelerator magnet settings.

The measurement at another angle, i.e. in addition to 0° and 90°, makes it possible to measure the correlations between the horizontal and vertical beam planes. As has been discovered by the inventor, the method mentioned in the present case, which uses just four measurements, is particularly advantageous since this method can be used to obtain a sufficient degree of measuring accuracy using the smallest number of measurements possible and therefore in the shortest amount of time.

Of course, it is however also possible to measure the four-dimensional phase space using a plurality of measurements, i.e. in particular at different angles, using the beam measuring device. For example, in an alternative measuring method, the four-dimensional phase space can also be measured using 6 measurements or 16 measurements. These measurements can, for example, be taken at equal angular distances and in partially modified magnet settings. Lastly, there is a mathematically infinite number (mechanical due to the angular resolution that is currently achievable of approximately 0.1° less) of possibilities for defining a sufficient number of linearly independent systems of equations using different measurements, in order to determine the 10 unknowns of the beam matrix C and therefore to obtain the 16 entries of the beam matrix C. According to present knowledge, the method described above that uses four measurements is, however, the optimum method for obtaining the beam emittance using the smallest number of measurements possible and therefore as quickly as possible.

In addition, the rotary module comprising the beam measuring apparatus can also be used to carry out a conventional measurement of the beam emittance in only two directions/planes, i.e. in particular at 0° and 90°. In this case, the rotary module according to one or more embodiments of the invention in fact advantageously allows for the omission of a separate measuring apparatus for the second direction, since both measurements can be carried out using the same measuring apparatus. If the two separate, traditionally required measuring apparatuses have had to be calibrated with respect to one another, the beam measuring apparatus according to one or more embodiments of the invention may also be advantageous in that the measuring apparatuses do not have to be calibrated with respect to one another, since the same measuring apparatus can be used twice.

FIG. 1 is a general view of a construction consisting of the measuring device 100 and the rotary module 20, the measuring device 100 being rotatably connectable to the rest of the accelerator facility 1 by means of two radial bearings 22, 22' of the rotary module 20 (see FIG. 12, for example). A component support 2 in turn makes it possible to accurately arrange and fasten the rotary modules 20 to a reference environment, typically to the floor 5 by means of a bolted floor connection 4. The weight of the overall construction consisting of the measuring device 100 and the two rotary modules 20, 20' can therefore be transferred into the ground in order to establish a load-free connection to the rest of the accelerator facility 1.

The radial bearing 22 comprises a first bearing side 24, which, in the case shown, is provided with fastening holes 26. An additional part of the accelerator facility 1, for example a beamline 6 (cf. FIG. 12, for example) can be connected to the first bearing side 24 of the radial bearing 22. In other words, the radial bearing 22 can be rigidly connected, i.e. in particular in a vacuum-tight manner, to the rest of the accelerator facility 1 by means of fastening means (not shown; for example screws) introduced into the fastening holes 26.

The radial bearing 22 also comprises a second bearing side 25 for receiving the measuring device 100 in a bearing manner. In the embodiment shown in FIG. 1, a bearing part 102 of the measuring device 100 engages in the radial bearing 22. In other words, the measuring device 100 is rotatably mounted in the radial bearing 20 so that the measuring device 100 can rotate relative to the immovable accelerator facility 1.

The measuring device 100 is specially constructed with regard to its geometry, measurement arrangement or mass distribution, for example. In the embodiment shown, a special slit grid emittance measuring device 100 of this kind is used. The measuring principle of the slit grid emittance measurement is known in principle in this case and is often used for accelerator facilities. The principle is explained on the basis of FIG. 4, which shows part of the interior of the measuring device 100.

A gate valve 28 is also provided in the rotary module 20, by means of which valve the rest of the accelerator facility 1 (cf. FIG. 12, for example) can be separated in an air-tight manner. The gate valve 28 (or gate valves 28) can advantageously be controlled such that the rotary module 20 is separated from the rest of the accelerator facility 1 for the duration of a rotational movement. In other words, during rotation of the measuring device 100, the gate valve 28 is closed such that a decrease in the tightness of the radial bearing 22, which may occur during the rotation, does not cause an increase in pressure in the rest of the accelerator facility 1. Test measurements using a test setup have shown that, during the rotational movement, the rolling bearing 37 (cf. FIGS. 8 and 9, for example) of the radial bearing 22, which rolling bearing was used in the test construction, allows a larger amount of ambient air to pass through the interior of the measuring device 100 even when a sealing element 27, for example a shaft seal 27, is used, and as a result the vacuum prevailing in the beam region of the accelerator could in certain circumstances be disturbed. In particular, it could, however, also be discovered that a vacuum-suitable lubricant on the shaft seal can considerably improve the sealing effect.

The rotary module 20 shown in FIG. 1 also comprises a drive device 30 for imparting a rotational movement on the measuring device 100. The drive device 30 comprises a drive unit 32, in this case a linear stepper motor 32. The drive unit 32 drives a belt drive 34, which acts on a pulley 36. In other words, by means of a V-belt 34, the torque is transmitted from the drive unit 32 to the pulley 36 of the measuring device 100 and thus causes the measuring device 100 to rotate.

In the embodiment shown in FIG. 1, the radial bearing 22 comprises the only drive device 30, and therefore the radial bearing 22' does not comprise a drive device 30. Depending on the load to be moved and the moment distribution, it is, however, also conceivable to attach an additional drive device 30 to the radial bearing 22'.

The rotary module 20 also comprises the measuring device 100. In this case, the measuring device 100 is a beam measuring device 100, more specifically a slit grid emittance measuring device. A central line portion 102 bridges the stretch between a first side 104 of the measuring device 100, which side is connected to the first radial bearing 22, and a second side 106 of the measuring device 100, which side is connected to the second radial bearing 22'. The length of the measuring device 100 can be dependent on the desired measuring method; however, the shortest possible overall beam path length is typically preferable. In other words, the distance between the first radial bearing 22 and the second radial bearing 22' can be adapted to the measuring device 100 used.

The measuring device 100 comprises a first actuator 110, which can move a slit 115 (cf. FIG. 4, for example) that is displaceable along a slit axis that is perpendicular to the beam axis 8 (cf. FIG. 4, for example). The actuator 110 is arranged on the side of the central line portion 102 and is connected thereto in a pressure-tight manner. The slit 115 can be moved into the central line portion 102 and into the beam axis 8.

Furthermore, a second actuator 120 is arranged on the side of the central line portion 102 and is connected thereto in a pressure-tight manner. The second actuator 120 moves a grid 125 (cf. FIG. 4, for example) that is displaceable along a grid axis that is perpendicular to the beam axis 8, it being possible for the grid 125 to be moved into the central line portion 102 and into the beam axis 8.

The measurement principle is as follows: if the particle beam impinges on the slit 115, a narrow strip of the particle beam is let through and the rest of the particle beam is absorbed in the slit support 116. Once the formerly narrow strip of the particle beam has passed through the stretch between the slit 115 and the grid 125, said strip impinges on the grid 125. By evaluating the charge induced on the individual grid wires by the particles impinging thereon, a spatially resolved angular profile can be measured for the narrow strip of the particle beam. This measurement can be carried out in a horizontal beam plane, in a vertical beam plane and typically in any plane that is at an angle of −45° and +45° to one of the two beam planes. In order to move the slit and grid into the corresponding orientation, the measuring device 100 is rotated by means of the rotary module 20. As established by the inventors during measuring methods, the overall 4D beam matrix of the particle beam can be measured using only said three measurement orientations of the measuring device 100.

The arrangement shown in FIG. 1 of the slit 115 and the grid 125, i.e. in particular whereby they are arranged on opposite sides of the central line portion 102, is advantageous in that the rotary module 20 is borne in a torque-free manner. In other words, the slit and grid could also be arranged on the same side of the central line portion 102, in particular even in a common housing, whereby a mass-balancing weight (not shown) would advantageously need to be attached opposite said slit and grid in this case in order to compensate for the torque that is generated by the weight and that acts on the rotary module 20. If the actuator 110 has a different weight to the actuator 120, a mass-balancing weight can also be used.

In addition to the one slit 115 and the one grid 125, it is also conceivable to arrange a second slit 115' and a second grid 125' in a measuring device 100, which can alternatively or alternately be moved into the beam axis 8 so that two measurement orientations can be measured without the measuring device 100 being rotated by the rotary module 20. However, in such an arrangement, it needs to be taken into consideration that the rotary module has a larger installation length due to an increased length of the central line portion 102. Furthermore, double the number of actuators 110, 120 and other parts would need to be used in this arrangement, which would lead to an increase in costs. Overall, the rotary module therefore also provides a considerable reduction in costs, since just one slit 115 and one grid 125 can be used for all the measurements.

A reader connector 122 is provided for reading out the profile grid signals from the grids 125, 125'.

FIG. 2 shows another embodiment of a rotary module 20. The drive of the radial bearing 22 is provided by a drive device 30 comprising a drive unit 32, a belt drive 34 and a pulley 36 (see FIG. 6 for a detailed view). The measuring device 100 is a slit grid emittance measuring device that is constructed for rotary use.

In the example in FIG. 2, a signal apparatus 50 provides a warning signal, for example a visual and/or acoustic warning signal, that can be given in the event of an imminent or active rotation of the measuring device 100.

The rotary module 20 comprises an end stop 44 for delimiting the angle of rotation available for the measuring device 100. In this example, the angle of rotation of the measuring device 100 is indicated using a position indicator 42 attached to the radial bearing 22. In the event of a corresponding angle of rotation of the measuring device 100, the position indicator 42 strikes the end stop 44 and mechanically terminates the rotational movement of the measuring device 100. Provided that a position switch is arranged on the end stop 44, in the event of a corresponding angle of rotation of the measuring device 100, the position indicator 42 can actuate the position switch and thereby directly electrically terminates the rotational movement, if necessary even before the position indicator 42 has applied a mechanical load to the end stop 44.

FIG. 3 is a sectional view of another embodiment of the rotary module 20, whereby the section is guided along the vertical plane and extends through the beam axis 8 (cf. FIG. 4, for example). Therefore, FIG. 3 shows the bearing part 108 arranged on the measuring device 100, for example, which bearing part engages in the radial bearing 22. In the case shown, the bearing part 108 is screwed to the measuring device 100.

A braking device 60 is used in the embodiment shown in FIG. 3 and is formed by means of a brake disk 62 and brake pads 64. The braking device 60 can be used to stop the rotational movement of the measuring device 100. The measuring device 100 can also be held in a measuring position by means of the braking device 60 and therefore potential bearing play or drive play or play in general can be reduced. The braking device can also be used, for example, to only allow the measuring device 100 to rotate after the presence of a person in the environment around the measuring device 100 can be ruled out.

In the sectional view in FIG. 3, a grid 125 is also shown in the retracted position. The grid 125 can be moved into the beam axis 8 by means of the actuator 120 so that the particle beam impinges on the grid 125.

FIG. 4 is a plan view of the rotary module 20, the beam axis 8 and components of the rotary module 20 arranged inside said module also being shown in the form of a sectional drawing. The bearing part 108 engages in the radial bearing 22; the bearing part 108' engages in the radial bearing 22'. In addition to the grid 125, the embodiment shown also shows the slit support comprising a slit 115. In the measuring position, the slit 115 and grid 125 would be moved into the beam axis 8 by means of the actuators 110, 120.

FIG. 5 is a side view of another embodiment of the rotary module 20. On a first bearing side 24, the particle beam is guided along the beam axis 8, through the radial bearing 22, the bearing part 108, the measuring device 110, the bearing part 108' and lastly through the radial bearing 22'.

The drive device 30 drives the rotational movement of the rotary module 20 by means of the drive unit 32, a sheave 31 arranged on the drive unit 32 and a belt drive 34 that guides by means of the sheave 31 and pulley 36.

FIG. 6 is a detailed view of the drive device 30. The drive unit 32, in this case a linear stepper motor 32, drives the belt drive 34 by means of the sheave 31, which belt drive in turn drives the pulley 36 that can be rigidly connected to the measuring device 100. A position indicator 42 indicates the angle of rotation of the measuring device 100 and/or makes it possible to detect a lateral end position, for example as soon as the position indicator 42 rests against one of the two end stops 44 shown.

FIG. 7 is another detailed view of a drive device 30. In this case, an angle sensor 38 is driven by the drive unit 32 by means of a sheave 31' and is capable of providing very accurate information relating to the angle of rotation set for the measuring device 100.

FIG. 8 is a detailed view of a radial bearing 22 comprising a rolling bearing 37. In the event of a rotation, the rolling bodies 37a roll along the circumference. A sealing element 27 allows for a reduction in the amounts of air supplied to the inner accelerator region. The sealing element 27 surrounds the bearing part 108 as tightly as possible.

FIG. 9 is another detailed view showing a radial bearing 22 comprising a rolling bearing 37 and rolling bodies 37a and showing the rotary module 20 being sealed by means of the sealing element 27 in the end region of the bearing part 108. The bearing part 108 is inserted into the radial bearing 22. In this embodiment, different external diameters are provided, which thereby allow for improved guiding of the rolling bearing 37 or optimized adaptation of the sealing element 27, for example.

FIG. 10 shows a possible embodiment of a braking device 60 comprising a brake disk 62, which comprises disk holes 68, so that the brake disk 62 can be locked or fixed in position by means of a disk bolt 66 that engages in a disk hole 68 and potential rotation of the measuring device 100 is prevented.

FIG. 11 shows another embodiment of a braking device 60 comprising a brake disk 62 and a brake pad 64 for applying a braking force to the brake disk 62.

Lastly, FIG. 12 is a view of an example part of the accelerator facility 1. A dipole magnet 200 first conducts the particle beam towards the beam axis 8. Correlations can be generated in the emittance planes or, if already present in the beam, can be eliminated by means of a skew triplet 202, which is a quadrupole triplet rotated by 45°, before the measuring points are passed. In the test setup shown, the triplet was substantially used for launching ROSE, since correlations that are deliberately produced can be calculated and now also measured using the new measuring system. In order to focus the beam and to change the accelerator setting, the duplet 204 can be used in the bunker wall.

Various measuring stations are shown in FIG. 12. For example, known, immovable slit grid emittance measuring facilities are shown in FIG. 12 for comparative measurement with the newly developed system.

Figure 13:
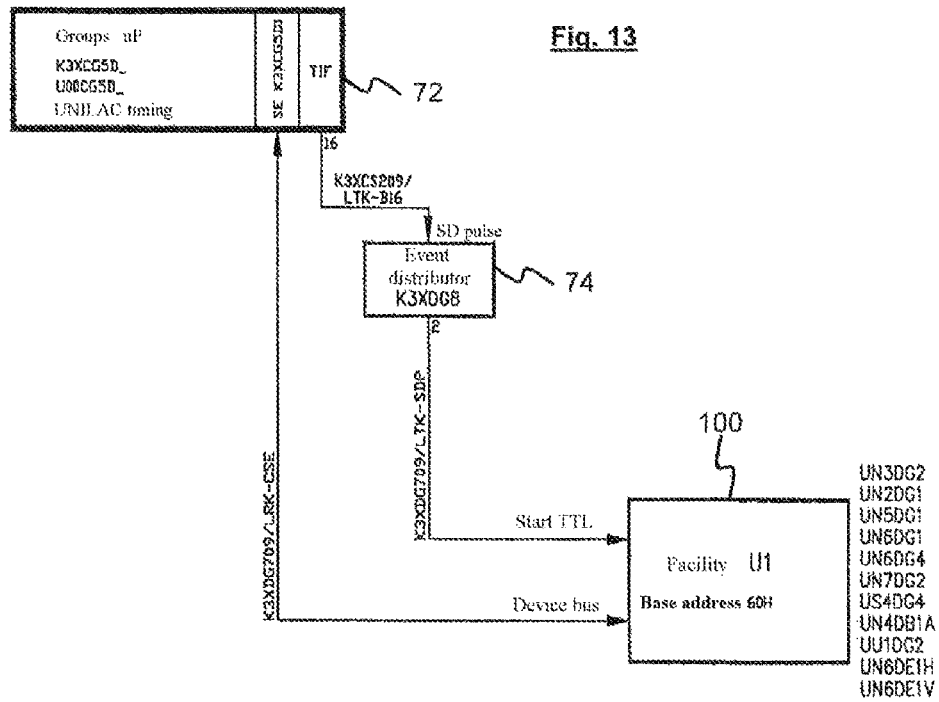
FIG. 13 is a block diagram showing activation of measurement electronics.

FIG. 13 is a block diagram of an example activation of the measurement electronics. The UNILAC timing module 72 emits a pulse to the event distributor 74 by means of the TIF. The measuring device 100 receives the pulse and starts the measurement. The measuring device 100 can also be provided with a direct connection to the UNILAC timing module 72 by means of a device bus.

Figure 14:
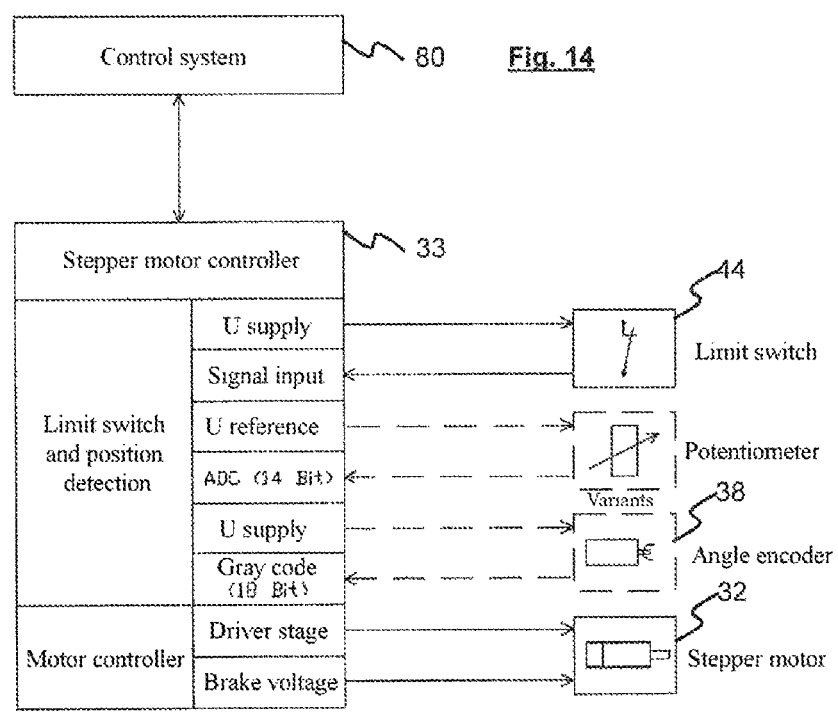
FIG. 14 is a block diagram showing activation of a stepper motor.

FIG. 14 is a block diagram of an example activation of the stepper motor 32 by means of the control system 80, which can be operated remotely, for example. The stepper motor controller 33 picks up the available data, for example from the angle sensor 38, and controls the stepper motor 32. The signal from the end stop 44 can, for example, also be processed by the stepper motor controller 33 in order to stop the stepper motor 32 from moving.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 accelerator facility
2 component support
4 bolted floor connection
5 floor
6 beamline
8 beam axis
20 rotary module
22 first radial bearing
22' second radial bearing
24 first bearing side
25 second bearing side
26 fastening holes
27 sealing element
28 gate valve
30 drive device
31 sheave
31' sheave
32 drive unit
33 stepper motor controller
34 belt drive, V-belt
36 pulley
37 rolling bearing
37a rolling body
38 angle sensor
42 position indicator
44 end stop
50 signal apparatus
60 braking device
62 brake disk
64 brake pad
66 disk bolt
68 disk hole 72 UNILAC timing module
74 event distributor
80 control system
100 measuring device
102 central line portion
104 first side of the measuring device
106 second side of the measuring device
108 bearing part
108' bearing part
110 first actuator
115 slit
116 slit support
120 second actuator
122 reader connector of the grid 125
125 grid
125' grid
200 dipole magnet
202 skew triplet
204 duplet

The invention claimed is:

1. A rotary module with a measuring device for determining a 4D beam emittance of a particle beam of an accelerator facility, the rotary module comprising:
an emittance measuring device;
a first radial bearing including:
a first bearing side configured to be paired with an accelerator-side flange connection, and
a second bearing side configured to receive the measuring device on the first radial bearing in a bearing manner; and
a drive configured to control a rotational movement of the emittance measuring device about an axis of rotation,
wherein the emittance measuring device is connected to the second bearing side such that the emittance measuring device is configured to be connected, via the first radial bearing, to the accelerator facility.

2. The rotary module according to claim 1, further comprising a second radial bearing including a first bearing side configured to receive the measuring device on the second radial bearing in a bearing manner, wherein the second radial bearing is arranged on the measuring device opposite the first radial bearing.

3. The rotary module according to claim 1, further comprising an angle-of-rotation measuring instrument configured to establish an angle of rotation of the measuring device, wherein the angle-of-rotation measuring instrument is connected to the drive.

4. The rotary module according to claim 1, further comprising an end stop including at least one limit switch configured to delimit the angle of rotation available for the measuring device.

5. The rotary module according to claim 1, wherein the accelerator facility includes a beamline in which a beam is guided, and wherein the first bearing side of the first radial bearing, is connected to the beamline.

6. The rotary module according to claim 1, wherein the drive includes a stepper motor, and/or wherein the drive transmits the rotational movement to the measuring device by means of a belt drive.

7. The rotary module according to claim 1, further comprising a braking device for slowing down or stopping the rotational movement of the measuring device and/or for locking the measuring device in a measuring position.

8. The rotary module according to claim 1, wherein a beam is guided through the accelerator facility, the first radial bearing and through the measuring device, along a beam axis, and wherein the axis of rotation is identical to the beam axis.

9. The rotary module according to claim 1, wherein a beam is a particle beam, and/or wherein the beam comprises hadrons and is a hadron beam.

10. The rotary module according to claim 1, wherein the accelerator facility comprises a particle accelerator.

11. An accelerator facility comprising a rotary module according to claim 1.

12. A rotatable slit grid emittance measuring facility, comprising:
a rotary module according to claim 1, wherein the emittance measuring device is a slit grid measuring device configured to measure a 4D beam matrix and, therefore, coupling emittances of the beam of the accelerator facility.

13. A method for determining a 4D beam emittance of a particle beam of an accelerator facility, the method comprising:
providing the rotary module according to claim 1,
measuring, with the emittance measuring device in a first measuring position, an emittance of the particle beam with regard to a first beam plane,
rotating, via the drive, the emittance measuring device into a second measuring position,
measuring, with the emittance measuring device in the second measuring position, a second emittance of the particle beam with regard to a second beam plane,
rotating, via the drive, the emittance measuring device into a third measuring position,
measuring, with the emittance measuring device in the third measuring position, a third emittance of the particle beam with regard to a third beam plane, and
adjusting accelerator magnet settings and measuring a fourth emittance of the particle beam with the emittance measuring device with regard to the third beam plane and/or with regard to the modified accelerator magnet settings.

14. The method according to claim 13, wherein the second measuring position is perpendicular to the first measuring position.

15. The method according to claim 13, wherein the third measuring position is at an angle of 45° to the first measuring position or the second measuring position.

* * * * *